US005605116A

United States Patent [19]
Kim et al.

[11] Patent Number: 5,605,116
[45] Date of Patent: Feb. 25, 1997

[54] ELECTRONIC ANIMAL TRAINING SYSTEM

[75] Inventors: J. S. Kim; Harry Currie, both of Dallas; Moon Choi, Plano, all of Tex.; H. Y. So, Incheon, Rep. of Korea

[73] Assignee: D.T. Systems, Inc., Dallas, Tex.

[21] Appl. No.: 299,443

[22] Filed: Sep. 1, 1994

[51] Int. Cl.⁶ ..................................................... A01K 15/02
[52] U.S. Cl. ................................................................ 119/720
[58] Field of Search ................................... 119/718, 719, 119/720, 721; 340/573, 574

[56] References Cited

U.S. PATENT DOCUMENTS

| | | |
|---|---|---|
| 1,684,009 | 9/1928 | Brown . |
| 2,441,812 | 5/1948 | Haffner . |
| 2,510,337 | 6/1950 | Franklin . |
| 2,800,104 | 7/1957 | Cameron . |
| 2,892,585 | 6/1959 | Gilmore . |
| 2,966,679 | 12/1960 | Harris . |
| 2,981,465 | 4/1961 | Bartel . |
| 3,161,005 | 12/1964 | Ackerson . |
| 3,258,811 | 7/1966 | Braun . |
| 3,509,693 | 5/1970 | French . |
| 3,589,337 | 6/1971 | Doss . |
| 3,687,112 | 8/1972 | Henderson . |
| 3,721,246 | 3/1973 | Landis . |
| 3,777,712 | 12/1973 | Gardner et al. . |
| 3,777,771 | 12/1973 | De Visscher . |
| 3,852,759 | 12/1974 | Felsenheld et al. . |
| 3,885,576 | 5/1975 | Symmes . |
| 3,885,733 | 5/1975 | Klebold et al. . |
| 3,998,459 | 12/1976 | Henderson et al. . |
| 4,152,705 | 5/1979 | Kowols . |
| 4,162,515 | 7/1979 | Henderson et al. . |
| 4,163,981 | 8/1979 | Wilson . |
| 4,169,267 | 9/1979 | Wong et al. . |
| 4,202,293 | 5/1980 | Gonda et al. . |
| 4,229,743 | 10/1980 | Vo et al. . |
| 4,238,800 | 12/1980 | Newington . |
| 4,335,682 | 6/1982 | Gonda et al. . |
| 4,394,956 | 7/1983 | Andrews et al. . |
| 4,435,713 | 3/1984 | Gasparaitis et al. . |
| 4,490,727 | 12/1984 | Kowols . |
| 4,539,937 | 9/1985 | Workman . |
| 4,745,882 | 5/1988 | Yarnell, Sr. ............................. 119/720 |
| 4,802,482 | 2/1989 | Gonda et al. ............................. 119/72 |
| 4,974,402 | 12/1990 | Gonda et al. . |
| 5,099,797 | 3/1992 | Gonda . |
| 5,193,484 | 3/1993 | Gonda . |

FOREIGN PATENT DOCUMENTS 3237927  4/1984  Germany ............................. 119/720

OTHER PUBLICATIONS

*Mays Pond Beeper Collar.* Orvis Catalog 1994.
*Orvis Fall Hunting and Fishing Catalog*, Mays Pond Beeper Collar, 1994, p. 10.
Photographs of Momentum Technology dog training system.

*Primary Examiner*—Thomas Price
*Attorney, Agent, or Firm*—Michael A. O'Neil

[57] ABSTRACT

An electro-shock training system including remote voice command capability. The training unit includes a hand-held transmitter which remotely controls a receiver unit attached to a collar worn by the animal to be trained. Positive feedback and voice commands are communicated to the animal via a speaker associated with the receiver unit. Negative reinforcement is provided in the form of a mild electrical shock via electrodes associated with the receiver unit.

4 Claims, 4 Drawing Sheets

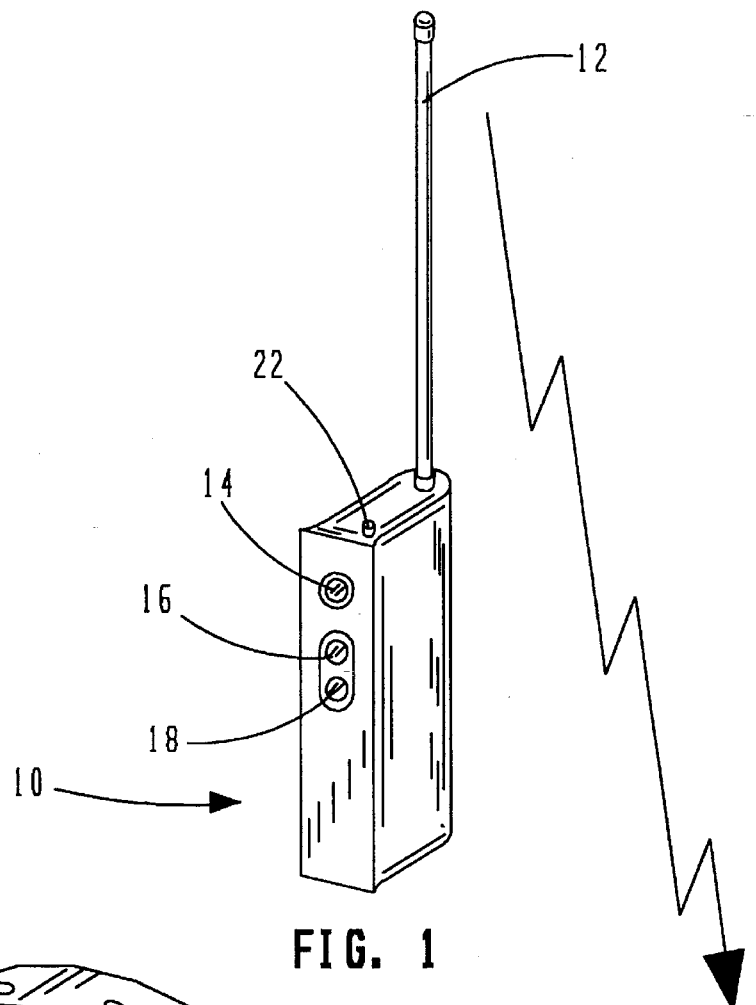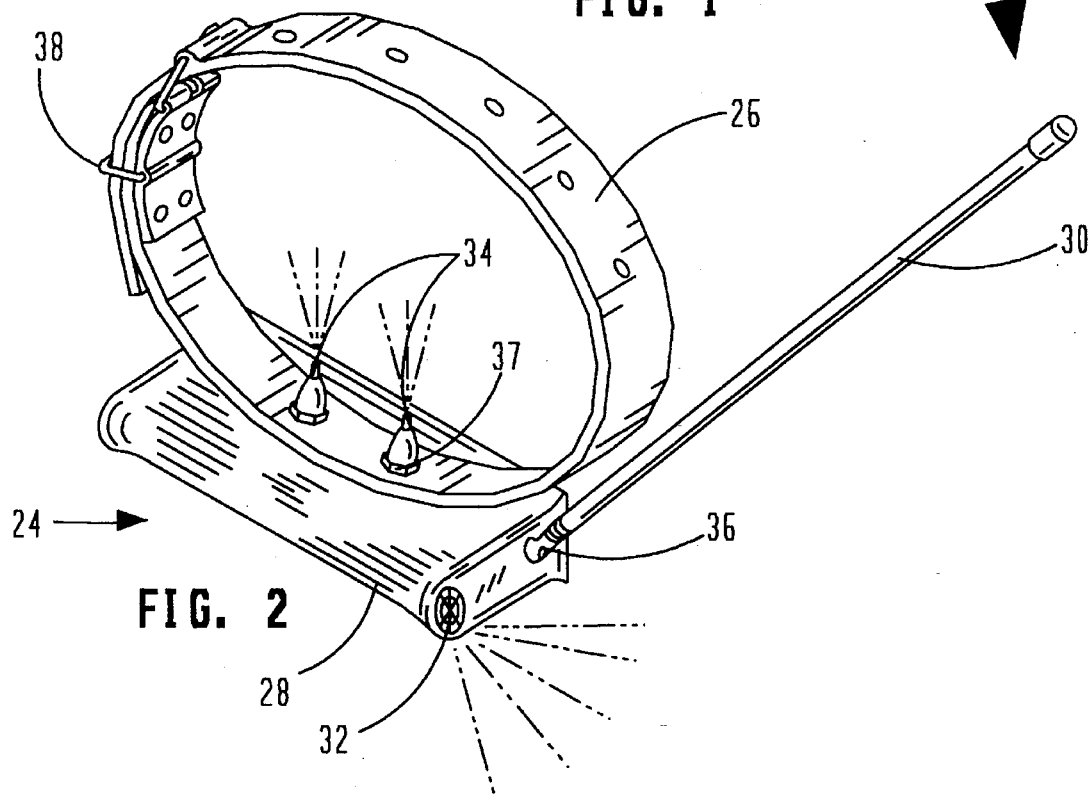

ELECTRONIC ANIMAL TRAINING SYSTEM

TECHNICAL FIELD

The present invention relates to electronic training aids for animals, and more specifically, to an electro-shock training collar for dogs including both positive and negative reinforcement features and remote voice command capability.

BACKGROUND OF THE INVENTION

Electronic training systems assist in the training of animals, usually domesticated animals such as dogs, primarily by discouraging undesired behavior of the animal. One such system is the electro-shock training device. Typically, discouragement of undesired behavior from the animal comes in the form of a mild electrical shock provided to the animal by a system including a receiver worn in some fashion by the animal and a transmitter associated with the trainer at some distance from the animal. Representative examples of such systems are described in U.S. Pat. Nos. 5,099,797 (Gonda), 5,193,484 (Gonda) and 4,794,402 (Gonda et al.).

Several inherent weaknesses are present in these prior art systems. For example, although traditional electro-shock training systems are effective at discouraging undesired behavior in an animal, there exists no means for positive reinforcement of desired behavior of the animal—a key element of a complete training regimen. An ideal training device would include both a method for positive, as well as negative, reinforcement of the behavior of the animal.

Additionally, voice commands are often a highly effective component in the training process. Voice commands from a trainer or master act both to communicate the desired behavior to the animal and to provide immediate positive and negative reinforcement of the behavior exhibited by the animal. The efficacy of this component of a training regimen is not only due to the immediacy and flexibility of the reinforcement provided, but is also due in part to the desire of the animal to please its trainer. Unfortunately, this highly effective tool is unavailable when the trainer is out of the hearing range of the animal.

Thus a need has arisen for a training system including the ability to provide both positive and negative reinforcement in response to behavior as well as remote command capability.

SUMMARY OF THE INVENTION

The present invention overcomes the foregoing and other problems associated with the prior art by providing an electronic animal training system which includes means for providing both positive and negative reinforcement of the behavior of the animal. The present invention also includes means for immediate delivery of voice commands from the trainer to the animal, even at remote distances.

The present training system includes a receiver worn on a collar around the neck of the animal to be trained and a hand-held transmitter operated by the trainer. The transmitter relays voice commands and/or spoken positive or negative reinforcement from the trainer to a speaker associated with the receiver on the neck of the animal.

Additionally, in the event the trainer wishes to discourage certain behavior exhibited by the animal, the trainer can provide a mild electrical shock via two electrodes located on the collar. The transmitter allows the trainer to provide varying predetermined levels of electrical shock to the animal from a remote distance.

BRIEF DESCRIPTION OF THE DRAWINGS

For a more complete understanding of the present invention and the advantages thereof, reference is now made to the following description taken in conjunction with the accompanying drawings in which:

FIG. 1 is a front view of an embodiment of the hand-held transmitter of the present invention training system;

FIG. 2 is a front view of an embodiment of the collar and receiver unit of the present invention training system;

DETAILED DESCRIPTION OF THE DRAWINGS

Figure 3:
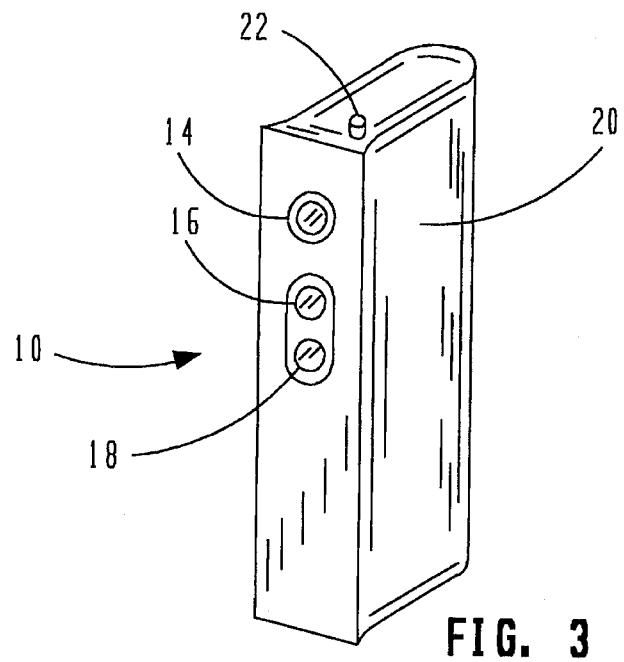
FIGS. 3 and 4 are front views of the transmitter and receiver units, the receiver unit without its detachable antenna.

Referring now to FIG. 1, there is shown an embodiment of the hand-held transmitter 10 of the present training system. The transmitter 10 is shaped and sized such that it is easily handled and manipulated by the human hand. Associated with the top of the transmitter 10 is a telescopic antenna 12. The antenna 12 is preferably telescopic, but can also be a helical, center-loaded antenna flexible in nature such that shape-deforming forces will not damage the antenna or hinder its function. FIG. 3 illustrates the transmitter 10 without the telescopic antenna 12 collapsed into the transmitter 10.

The system consists of a dual-channel (2 frequency) training system. On the face of the transmitter 10 are a series of buttons 14, 16 and 18. Button 14 controls the remote command feature of the training system. When depressed, a small microphone 20 located on the side of the transmitter 10 is activated and a first signal is generated and transmitted to the receiver, allowing the trainer to broadcast spoken commands to the receiver unit (FIG. 2). In this embodiment, signals are transmitted at 27 MHz. Although the embodiment illustrated transmits signals at 27 MHz, it should be noted that any appropriate frequency band allowed by the Federal Communication Commission could be utilized, if desired.

Buttons 16 and 18 on the transmitter 10 allow the trainer to provide predetermined levels of a mild electrical shock to the animal being trained. Button 16 causes the transmitter to generate and transmit a signal at a second frequency to the remote receiver unit (FIG. 2) to provide a mild shock. If needed, button 18 provides a relatively stronger level of electrical shock to the animal. Although only two buttons are illustrated, it should be noted that any number of buttons or other activation devices could be utilized to provide varying predetermined levels of electrical shock to the animal being trained.

The transmitter 10 is powered by a battery located within the unit (not shown). An indicator lamp 22 is provided on the transmitter 10 and is illuminated when any button is depressed on the transmitter 10. This feature allows the user to identify when a button has been depressed successfully as well as instances when the transmitter is without sufficient battery power to provide proper signal transmittal.

FIG. 2 illustrates the remote receiver unit 24 of the present training system. Like the transmitter unit 10, the receiver unit 24 is powered by a battery located within it (not shown).

A small switch (not shown) turns the receiver unit 24 off and on. The receiver unit 24 comprises a collar portion 26 and a receiver 28. The collar 26 provides a convenient method of positioning and securing the receiver unit 24 to the neck of the animal being trained (not shown).

Figure 4:
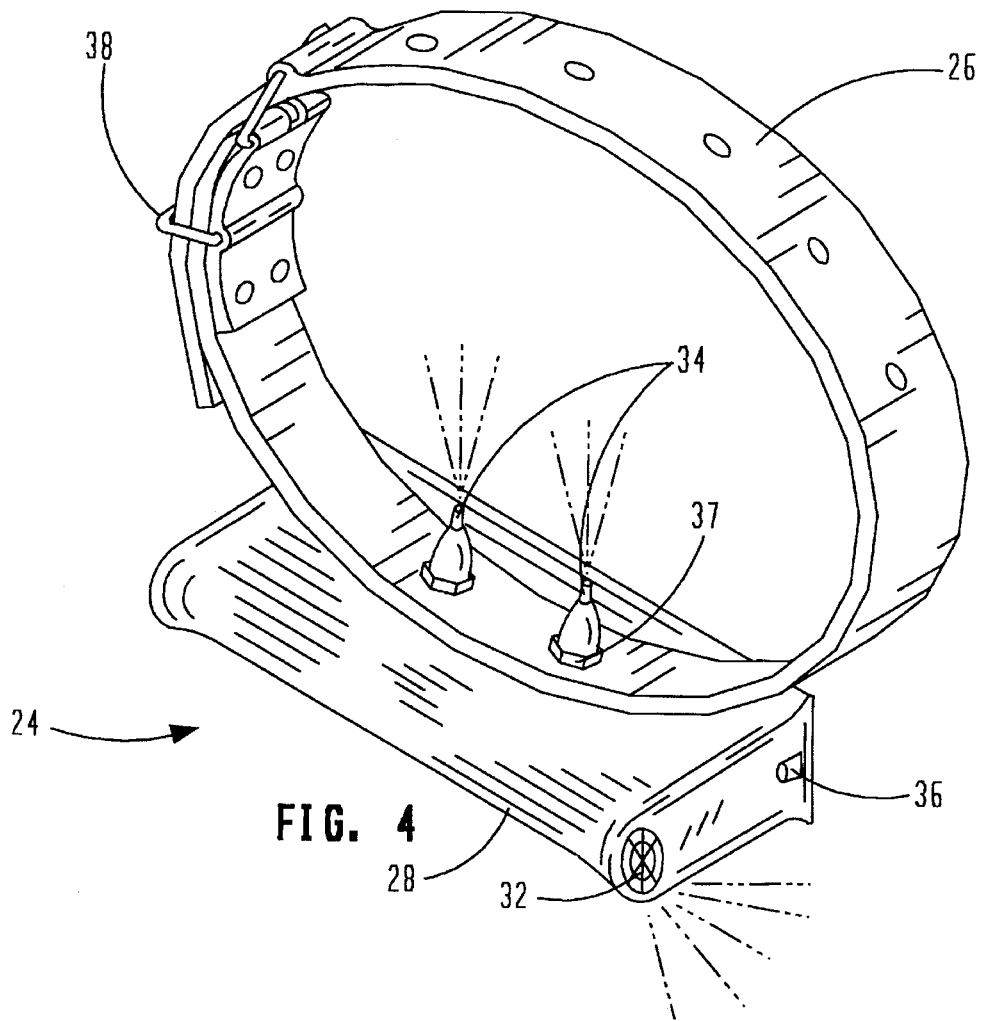
Figure 5:
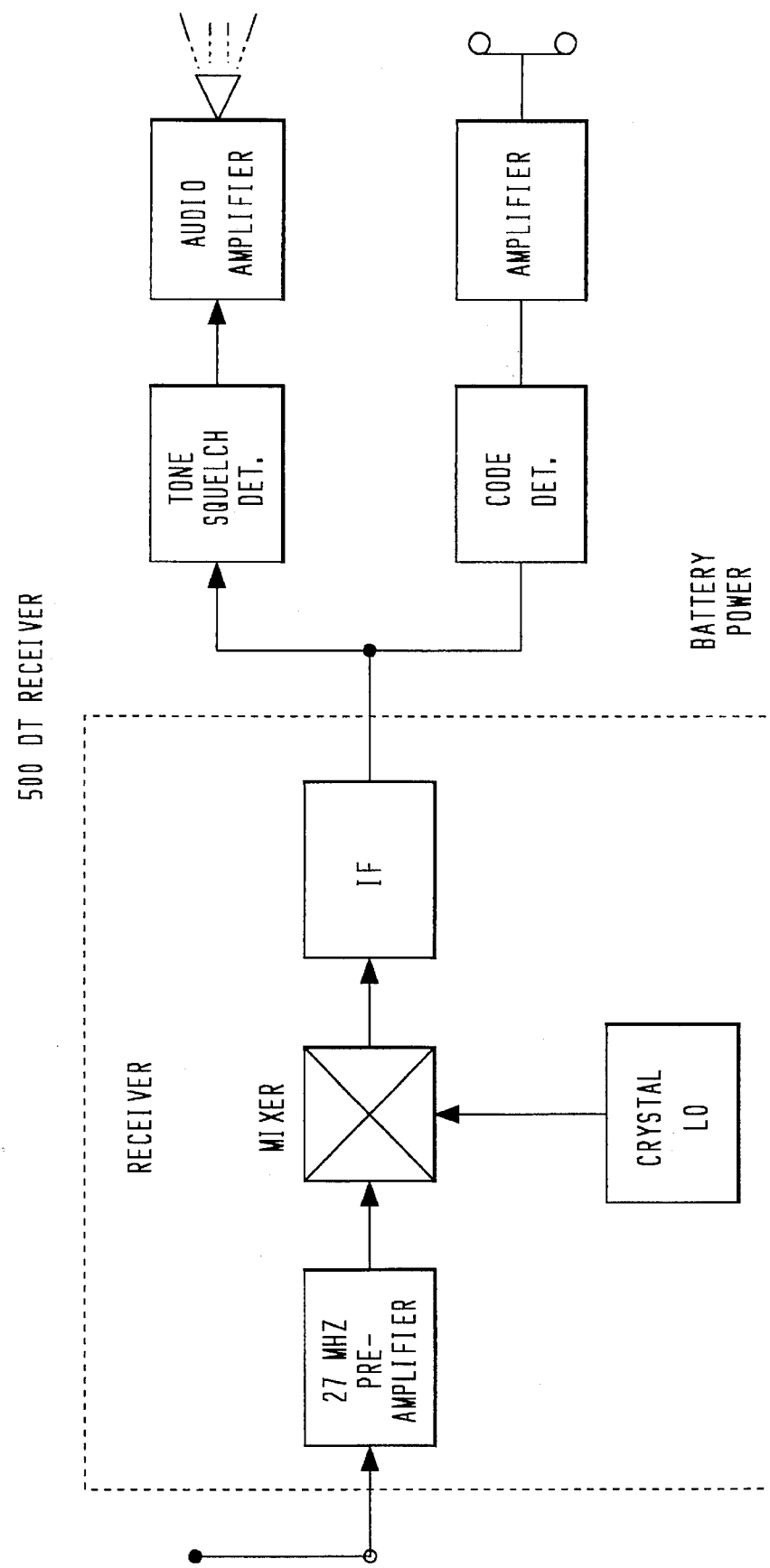
FIGS. 5 and 6 are electrical schematics of the transmitter and receiver units of the present invention training system.
Figure 6:
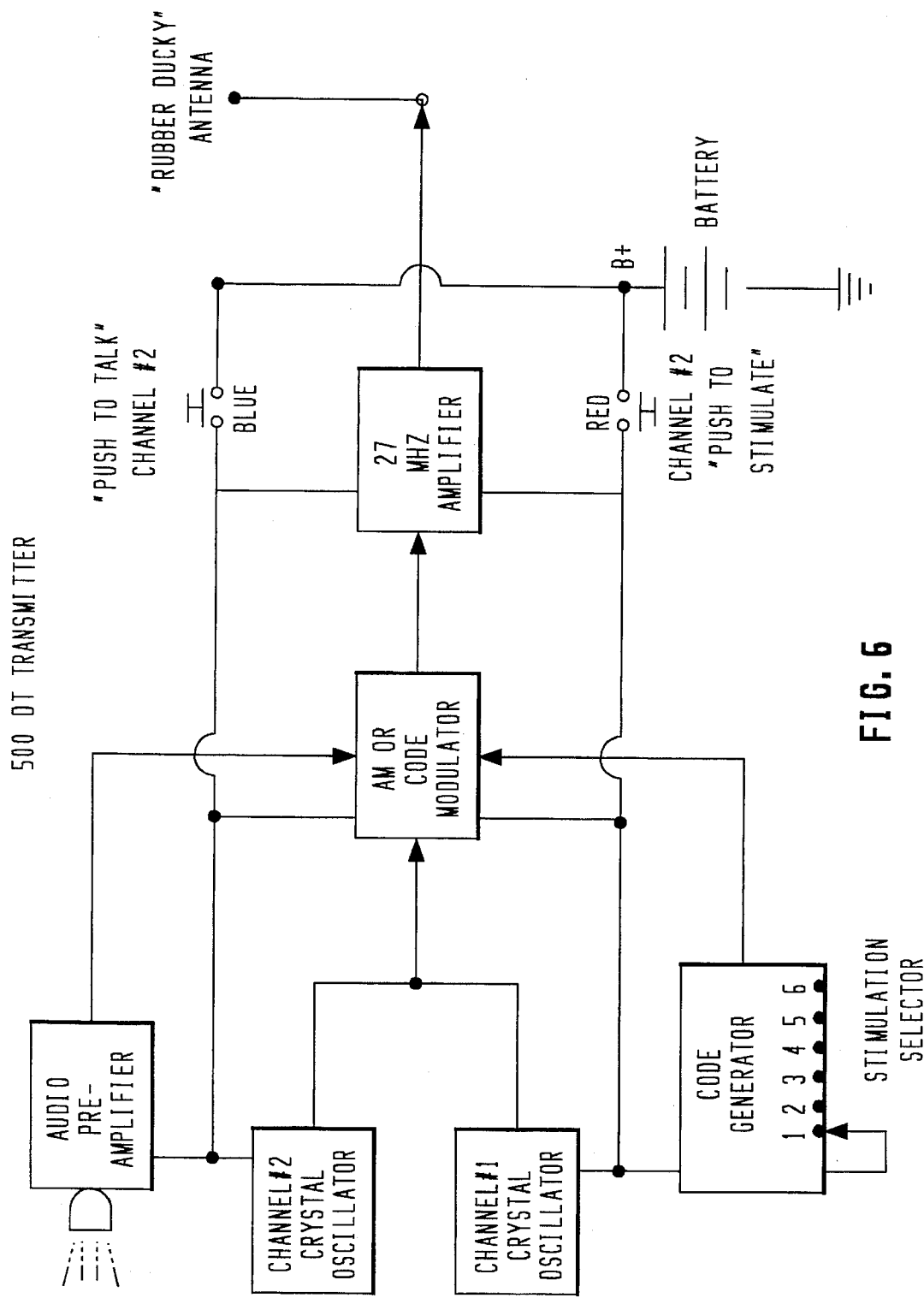

The receiver unit 24 includes a detachable antenna 30, a speaker 32 and two electrodes 34. The detachable antenna 30 is preferably of a flexible, center-loaded design, but could also be telescopic like the antenna 12 associated with the transmitter 10 (FIG. 1). The antenna 30 is detachably connected to the receiver unit 24 via a positionable mount 36. The positionable mount 36 is attached to the receiver unit 24 such that its position can be changed via a screw. This feature allows for the antenna 30 to be fixed at variable angles with respect to the receiver unit 24 for maximum range of the training system as well as ease of use for the trainer and animal. FIG. 4 illustrate the receiver unit 24 without the detachable antenna 30.

The speaker 32 is used to broadcast spoken commands transmitted from the transmitter 10. When button 14 of the transmitter unit 10 is depressed, spoken commands of the trainer are transmitted via a signal at a first frequency to the receiver unit 24 and broadcast to the animal being trained via the speaker 32.

The electrodes 34 of the receiver unit 24 are positioned adjacent to the neck of the animal to be trained when properly secured to the animal. Upon receiving a signal at a second frequency from the transmitter 10, the electrodes provide a mild electrical shock to the neck of the animal being trained. Depressing button 18 on the transmitter 10 will provide a greater predetermined level of electrical shock than depressing button 16. The electrodes 34 are insulated over a substantial portion of their length, leaving only the tips of the electrodes exposed for contact with the skin of the animal being trained. This feature allows the proper amount of shock to be provided even in the event the animal is wet.

The collar 26 is attached to the receiver 28 at the electrodes 34 with nuts 37 shaped to provide the aforementioned insulation of the electrodes 34. The collar 26 is of typical construction and can be adjusted to fit a large range of neck sizes via a buckle assembly 38.

In use, the receiver unit 24 of the training system is positioned and secured to the neck of the animal being trained via the collar portion 26 of the receiver unit 24. The buckle assembly 38 allows the collar to be easily fitted to a large range of neck sizes. When secured the collar portion 26 positions the electrodes 34 of the receiver unit 24 such that they contact the skin of the animal being trained. The receiver unit 24 is then turned "on" and the animal is released for training.

From a remote distance, a trainer controls the hand-held transmitter 10. As the animal is trained, spoken commands, positive and negative reinforcement in the form of speech, and further negative reinforcement in the form of a mild electrical shock are selectively transmitted to the animal via the transmitter 10.

Although a preferred embodiment of the invention has been illustrated in the accompanying drawings and described in the foregoing Detailed Description, it will be understood that the invention is not limited to the embodiment disclosed, but is capable of numerous rearrangements and modifications of parts and elements without departing from the spirit of the invention.

We claim:

1. A dog training system, comprising:
   A. a transmitter unit including:
   a transmitter housing,
   a microphone mounted on the transmitter housing for receiving a voice training command,
   switch means mounted on the transmitter housing,
   a first transmitting circuit mounted within the transmitter housing and responsive to the switch means for transmitting a shock triggering signal,
   a second transmitting circuit mounted within the transmitter housing and responsive to the microphone and the switch means for transmitting a voice training command signal,
   said first and second transmitting circuits operating on separate channels and therefore adapted for simultaneous operation, and
   antenna means mounted on the transmitting housing for transmitting signals generated by the first and second transmitting circuits; and
   B. a receiver unit including:
   at least one shocking electrode,
   means for mounting the shocking electrode on a dog to be trained with the shocking electrode in contact with a predetermined part of the body of the dog,
   a receiver housing supported on the mounting means,
   a first receiver circuit mounted within the receiver housing for generating a shocking signal through the shocking electrode in response to receipt of a shock triggering signal from the transmitter unit,
   a second receiver circuit mounted within the receiver housing for generating an output signal in response to receipt of the voice training command signal from the transmitter unit,
   a speaker mounted on the receiver housing and responsive to the output of the second receiver circuit for generating a voice command reproduction of a voice command received by the microphone on the transmitter unit, and
   a receiver antenna mounted on the mounting means and operably connected to the first and second receiver circuits for transmitting received signals thereto.

2. The dog training system of claim 1, wherein the transmitter unit is hand-held.

3. The dog training system of claim 1, wherein the mounting means is an adjustable collar and wherein the shocking electrode extends through the adjustable collar to provide proper contact with the dog wearing the collar.

4. The dog training system of claim 1, wherein the transmitter and receiver include means for providing a plurality of predetermined levels of electrical shock to the dog.

* * * * *